United States Patent
Liu et al.

(10) Patent No.: US 12,143,506 B2
(45) Date of Patent: Nov. 12, 2024

(54) ESTABLISHING PKI CHAIN OF TRUST IN AIR GAPPED CLOUD

(71) Applicant: MICROSOFT TECHNOLOGY LICENSING, LLC, Redmond, WA (US)

(72) Inventors: Pu Liu, Carnation, WA (US); Yingchang Charley Zhang, Redmond, WA (US); Sahil S. Chavan, Redmond, WA (US); Deyang Gu, Mercer Island, WA (US); Lucius B. Fleuchaus, Redmond, WA (US); Akshay Kishor Kulkarni, Redmond, WA (US); David Nunez Tejerina, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 17/585,198

(22) Filed: Jan. 26, 2022

(65) Prior Publication Data

US 2023/0239163 A1    Jul. 27, 2023

(51) Int. Cl.
*H04L 9/32* (2006.01)
*H04L 9/08* (2006.01)

(52) U.S. Cl.
CPC .......... *H04L 9/3263* (2013.01); *H04L 9/0825* (2013.01); *H04L 9/3236* (2013.01); *H04L 9/3247* (2013.01)

(58) Field of Classification Search
CPC .................................... H04L 9/0825
See application file for complete search history.

(56) References Cited

U.S. PATENT DOCUMENTS

| | | | | |
|---|---|---|---|---|
| 8,689,347 B2* | 4/2014 | Teow | ...................... | G06F 21/78 713/172 |
| 9,413,538 B2* | 8/2016 | Baumann | ............... | H04L 9/3263 |
| 9,537,650 B2* | 1/2017 | Auradkar | .............. | H04L 9/0833 |
| 10,951,418 B1* | 3/2021 | Graziano | ............. | H04L 9/3263 |
| 11,252,143 B2* | 2/2022 | Shimazawa | ......... | H04L 63/0823 |
| 11,362,844 B1* | 6/2022 | Cook | .................... | H04L 9/3265 |
| 2008/0120698 A1* | 5/2008 | Ramia | ..................... | H04L 63/08 726/4 |
| 2008/0120707 A1* | 5/2008 | Ramia | ................. | H04L 63/0861 726/5 |

(Continued)

*Primary Examiner* — Hitesh Patel
*Assistant Examiner* — Vinh Nguyen
(74) *Attorney, Agent, or Firm* — Shook, Hardy & Bacon L.L.P.

(57) ABSTRACT

Technology is shown for establishing a chain of trust for an unknown root certificate in an isolated network that is verified using a chain of trust external to the network. A bootstrap executable and a leaf certificate rooted in the external chain of trust are configured with an OID. The leaf certificate is received in the isolated network and used to sign a new root certificate created in the isolated network to create a blob that is stored in a pre-determined location. The bootstrap executable is executed to instantiate a client machine, which retrieves the blob and verifies its signature using the leaf certificate. The client machine verifies that the OID values from the blob and bootstrap executable match. If the signature and OID checks are successful, then the new root certificate is distributed within the isolated network and installed in a PKI certificate chain of trust.

20 Claims, 11 Drawing Sheets

(56) References Cited

U.S. PATENT DOCUMENTS

| | | | | |
|---|---|---|---|---|
| 2011/0258685 | A1* | 10/2011 | Qiu | G06F 21/572 |
| | | | | 726/5 |
| 2011/0302412 | A1* | 12/2011 | Deng | H04L 63/0407 |
| | | | | 713/155 |
| 2012/0117608 | A1* | 5/2012 | Metke | H04L 63/0823 |
| | | | | 726/1 |
| 2012/0204032 | A1* | 8/2012 | Wilkins | H04L 9/321 |
| | | | | 713/170 |
| 2014/0281497 | A1* | 9/2014 | Medvinsky | H04L 9/006 |
| | | | | 713/156 |
| 2016/0050199 | A1* | 2/2016 | Ganesan | G06F 21/33 |
| | | | | 726/7 |
| 2017/0169097 | A1* | 6/2017 | Petri | G06F 9/46 |
| 2017/0324566 | A1* | 11/2017 | Kawasaki | H04L 9/006 |
| 2018/0101677 | A1* | 4/2018 | Broumas | H04L 9/006 |
| 2018/0139044 | A1* | 5/2018 | Lange | G06F 21/12 |
| 2018/0316660 | A1* | 11/2018 | Fan | H04L 63/126 |
| 2019/0342397 | A1* | 11/2019 | Laibson | H04L 9/3213 |
| 2020/0267004 | A1* | 8/2020 | Lounsberry | H04L 9/3265 |
| 2020/0293663 | A1* | 9/2020 | Mugundan | H04W 4/70 |
| 2020/0304299 | A1* | 9/2020 | Medvinsky | H04L 9/0844 |
| 2021/0058234 | A1* | 2/2021 | Meyers | H04L 9/3239 |
| 2021/0092604 | A1* | 3/2021 | Fox | H04W 12/08 |
| 2021/0258665 | A1* | 8/2021 | Sadasivarao | H04L 63/0853 |
| 2021/0306135 | A1* | 9/2021 | Chu | H04L 9/0643 |
| 2021/0336797 | A1* | 10/2021 | Van Duren | H04L 9/3263 |
| 2022/0229938 | A1* | 7/2022 | Robison | H04L 9/3263 |
| 2022/0239641 | A1* | 7/2022 | Eckl | H04L 67/12 |
| 2022/0247576 | A1* | 8/2022 | Beekman | H04L 9/3263 |
| 2023/0033986 | A1* | 2/2023 | Cook | H04L 9/3247 |
| 2023/0104332 | A1* | 4/2023 | Lambert | H04L 9/3247 |
| | | | | 713/157 |
| 2024/0010095 | A1* | 1/2024 | Shin | B60L 53/66 |

* cited by examiner

ESTABLISHING PKI CHAIN OF TRUST IN AIR GAPPED CLOUD

BACKGROUND

A frequently utilized approach to providing services and increasing performance of computing devices is the use of remote computer resources, e.g. the "cloud." For example, processes can be implemented in remote cloud resources to respond to user control inputs or other data input and the resulting output of the process may be communicated to a user device for display.

It is often advantageous to access remote computer resources over the internet to utilize shared pools of computer system resources that can offer high capacity computing or storage on an on-demand basis and which can be maintained by third party cloud service providers. Cloud service providers typically offer on-demand availability of computer system resources, such as data storage and computing power.

Cloud computing generally relies on sharing of resources to achieve economies of scale, which can result in multiple entities utilizing the same cloud resources. The cloud resources need to be accessible to the different entities in order to utilize the resources, which involves a high level of public network access to the cloud resources.

Cyberattackers also have public network access that can be utilized to attempt to penetrate cloud resources, which can be a particular security concern to entities in critical sectors, such as classified military or other government networks. However, the advantages of cloud computing are often beneficial to these critical sectors.

One approach to providing cloud resources to critical sectors is to implement an Air-gapped Cloud (AGC), which is an isolated cloud platform that is dedicated to providing computing resources to a set of critical sectors, e.g. federal governmental entities. However, an isolated AGC does not have access to some of the resources normally available in a non-isolated public network to establish a PKI chain of trust for security within a network.

It is with respect to these and other technical challenges that the disclosure made herein is presented.

SUMMARY

The disclosed technology is directed to establishing a PKI chain of trust for an unknown AGC root certificate in an isolated AGC environment that is verified using a chain of trust external to the AGC environment. An advantage of the disclosed technology is that security is improved by utilizing a known PKI chain of trust in a non-isolated network environment to establish a PKI chain of trust in the isolated AGC environment.

In general terms, for example, a digital AME leaf certificate, such as a certificate in accordance with the X.509 standard, is created in a PKI chain of trust that is rooted to an AME root certificate for a non-isolated network environment hosted on a cloud service platform. The AME leaf certificate is configured with a predetermined Object Identifier (OID) value corresponding to the isolated AGC environment. For example, the OID value can be added to the AME leaf certificate as a property in accordance with the X.509 standard. A bootstrapper executable corresponding to the isolated AGC environment is also configured with the OID value. The OID and bootstrapper executable are stored in a deployment environment for the cloud service platform.

The AME leaf certificate created in the non-isolated network environment is securely transported across an air gap to the isolated AGC environment. The AME root certificate is available in the AGC environment, such that the chain of trust for the AME leaf certificate can be verified in the AGC environment.

A new AGC root certificate is created in the isolated AGC environment. A first hash value of the AGC root certificate is generated and added to the AGC root certificate. The AGC root certificate and OID are signed by the AME leaf certificate to create a signed blob. The signed blob is stored in a pre-determined location in the deployment environment.

A bootstrap process is initiated is the isolated AGC environment that executes the bootstrapper executable configured with the OID from the deployment environment to instantiate a client virtual machine. The client machine obtains the signed blob from the pre-determined location and verifies the signature of the blob using the AME leaf certificate. The AME leaf certificate can be verified using the AME root certificate available in the AGC environment.

The client machine can also verify that the OID value from the blob matches the OID value configured in the bootstrapper executable corresponding to the isolated network. If the signature and OID checks are successful, then a second hash value is calculated for the AGC root certificate. If the second hash value matches the first hash value stored in the AGC root certificate, then the AGC root certificate is valid. The valid AGC root certificate is distributed and installed in the PKI system for the AGC environment.

Methods, systems and computer-readable media for establishing a PKI chain of trust in an isolated cloud computing environment in accordance with aspects of the disclosed technology are shown that involve receiving a digital leaf certificate in the isolated cloud computing environment, the digital leaf certificate being rooted to a first root certificate in a non-isolated PKI chain of trust in a non-isolated computing environment and the digital leaf certificate including a first object identifier value. The disclosed technology further involves obtaining a second root certificate in the isolated cloud computing environment, signing the second root certificate with the digital leaf certificate to generate a signed blob, and storing the signed blob to a predetermined storage location in the isolated cloud computing environment. The disclosed technology also involves executing a bootstrap executable configured with a second object identifier value, obtaining the signed blob from the predetermined storage location in the isolated cloud computing environment, and verifying the signed blob with the digital leaf certificate. When the signed blob is verified, the disclosed technology involves comparing the first object identifier value from the digital leaf certificate to the second object identifier value from the bootstrap executable and, when the first and second object identifier values match, installing a PKI chain of trust rooted in the second root certificate for the isolated cloud computing environment.

Some examples of the disclosed technology also involve calculating a first hash value for the second root certificate, including the first hash value in the second root certificate, and calculating a second hash value for the second root certificate obtained from the signed blob obtained from the predetermined storage location in the isolated cloud computing environment, comparing the first hash value to the second hash value. In these examples, the operation of, when the first and second object identifier values match, installing a PKI chain of trust rooted in the second root certificate for the isolated cloud computing environment involves, when the first and second object identifier values match and the first and second hash values match, installing a PKI chain of trust rooted in the second root certificate for the isolated cloud computing environment.

Certain other examples of the disclosed technology involve obtaining the digital leaf certificate in the non-isolated cloud computing environment, storing the digital leaf certificate with the first object identifier value in a storage medium, configuring the bootstrap executable with the second object identifier value, the second object identifier value matching the first object identifier value. These examples also involve updating a deployment environment with the bootstrap executable configured with the second object identifier value and updating InstallPKIroots in the development environment with the second object identifier value.

In further examples, the storage medium storing the digital leaf certificate with the first object identifier value can be a removable storage medium. In certain examples, the first object identifier value is stored as an X.509 property of the digital leaf certificate.

In particular examples, the first root certificate in the non-isolated PKI chain of trust is accessible in the isolated environment. Some of these examples include verifying the digital leaf certificate with the first root certificate that is accessible in the isolated environment.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
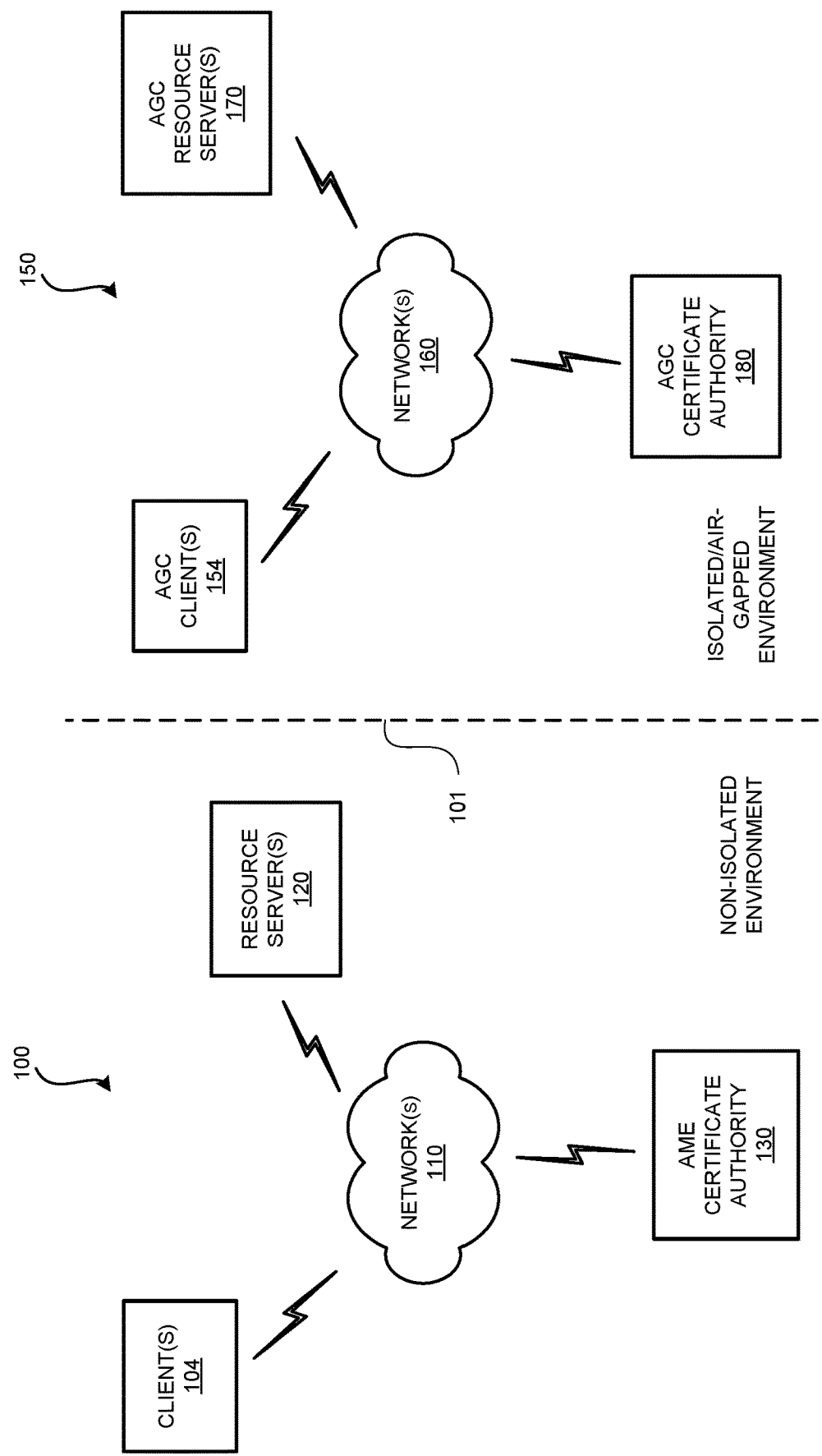
FIG. 1 is a network architecture diagram showing an illustrative computing system involving a non-isolated environment and an isolated air gapped environment hosted on a cloud computing resource provider system.

The following detailed description is directed to a computer-implemented system for establishing a chain of trust for an unknown root certificate in an isolated network, e.g. an AGC environment, that is verified using a chain of trust external to the network. A leaf certificate rooted in the chain of trust external to the isolated network can be received in the isolated network along with a predetermined Operator Identifier (OID) value. A bootstrapper executable for the isolated network is also configured with the OID value. A new root certificate is created in the isolated network and the new root certificate and OID are signed to create a signed blob. The blob is stored in a pre-determined location in the isolated network.

A bootstrap process in the isolated network executes the bootstrapper executable configured with the OID to instantiate a client machine. The client machine retrieves the blob from the pre-determined location and verifies the signature of the blob using the leaf certificate and a root certificate of the chain of trust external to the isolated network. The client machine also verifies that the OID value from the blob matches the OID value configured in the bootstrapper executable. If the signature and OID checks are successful, then, in some examples, a hash value for the isolated network root certificate is validated and, if successful, the new isolated network root certificate is distributed within the isolated network and installed in a PKI certificate chain of trust.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of a machine learning system that provides reduced network bandwidth transmission of content will be described.

One approach to securing communications between entities in a network is the use of public key infrastructure (PKI) to create, manage, distribute, use, store and revoke digital certificates and manage public-key encryption for secure network communications. PKI facilitates the secure electronic transfer of information for a range of network activities, such as e-commerce, interne banking and confidential email, where simple password protection is generally an inadequate authentication method and more rigorous proof is required to confirm the identity of the parties involved in the communication and to validate the information being transferred.

Digital certificates can allow entities to establish secure communication between the entities using the public keys included in each certificate to encrypt data. Data encrypted using the public key from an entity's digital certificate can be decrypted by the entity using its locally stored private key.

The integrity of a digital certificate in PKI generally involves a chain of trust that links a digital certificate, e.g. a leaf certificate associated with an entity, to a root certificate often through a series of intermediate certificates. A leaf certificate typically is signed using a private key of an intermediate certificate to which it is linked such that the leaf certificate can be verified using a public key of the intermediate certificate. The chain may include multiple intermediate certificates. Each certificate in the chain is signed by a preceding certificate, if any, reaching back to a root certificate and each certificate includes the certificates to which it is linked. Typically, the root certificate is associated with a major system provider and is publicly known.

In a public network, the public root certificate, e.g. AME root certificate, is normally publicly known and readily accessible. On the non-isolated side, a chain of trust rooted on the AME root certificate is normally used to sign PKI certificates for use in PKI certificate verification.

However, an isolated AGC typically uses a different root certificate, e.g. AGC root certificate, than the root certificate in public clouds that is not publicly known. If a new AGC root is merely provisioned by an internal AGC operator, e.g. a Certificate Authority (CA) internal to the AGC, then the chain of trust of the PKI system must blindly trust the new AGC root. The PKI system will generally not be able to detect whether the AGC root is compromised.

Typically, PKI systems distribute the public portion of root certificates as part of an initial bootstrap process. For example, a bootstrap executable that is signed with a code signing certificate, such that the executable is trusted by the operating system, usually provisions additional root certificates to establish additional trust. In this scenario, the root certificates are embedded in the bootstrapper executable.

However, in an AGC environment, the conventional bootstrap process cannot be successfully utilized because a) the public portion of the AGC root certificate is not known prior to the bootstrap process and, therefore, cannot be embedded into the initial bootstrap executable and b) the public portion of the AGC root certificate is not permitted to leave the AGC in order to maintain isolation for security.

In the disclosed technology, in general terms, trust flows from a chain of trust outside of the AGC environment to ensure that the new AGC root can be trusted by the PKI system. A new AGC root certificate can be provisioned post bootstrap in an air-gapped and secure cloud without revealing the public portion of the AGC root certificate outside of the AGC environment. The chain of trust of an external environment is effectively extended to the AGC environment to ensure the integrity of the AGC root certificate.

In one example, an external identity system, such as the cloud service providers certificate system, e.g. AME certificate system, is used to generate a leaf certificate, e.g. AME leaf, that is rooted to the external identity system, e.g. AME root. The AME leaf can then be stored on physical storage device, such as a special smart card with a known Operator Identifier (OID) that is issued to security cleared personnel.

The security cleared personnel can transport the physical storage device to an AGC operator. The AGC operator uses the AME leaf certificate from the physical storage device to sign a new AGC root certificate and the OID to create a signed blob. The digitally signed blob is stored to into a pre-determined location in the AGC.

Note that the AME chain of trust rooted in the AME root would normally be used to sign certificates on the non-isolated side for PKI verification. In this example, the use of the AME leaf certificate is not used for PKI certificate verification, but for code signing and the physical storage device.

An AGC internal cloud service queries this pre-determined location, downloads the signed blob and validates the signature of the blob using the root of the external certificate system, e.g. AME root, that the leaf certificate is rooted to and that is accessible within the AGC. The internal cloud service also confirms that the signature contains the known OID. If the signature and OID checks pass, then the new AGC root is trusted and can be distributed within the AGC. The physical storage device can then be destroyed or permanently erased to prevent any further use.

A technical advantage of the disclosed technology is that the trust from an established PKI chain of trust can be carried over into an isolated environment and used to verify a root certificate for the isolated environment reducing the risk of a compromised root certificate being installed in the isolated environment. Other technical effects other than those mentioned herein can also be realized from implementation of the technologies disclosed herein.

FIG. 1 is a network architecture diagram showing an illustrative non-isolated cloud computing environment 100 involving user or enterprise-controlled client devices 104 in combination with cloud compute resources provided by computer resource provider system 120. In this example, computing device 104 can be a client device, such as personal computers, laptop computers, tablet computers, or smart phones. In other examples, environment 100 can include servers operated and maintained by a customer on their own premises. The client device 104, in this example, is in communication with the resources of compute resource provider 120 through network 110.

Note that a cloud computing environment may include many computer resource provider systems 120 offered by different providers. Examples of compute resource providers include the WINDOWS AZURE Service Platform from MICROSOFT CORPORATION, the AMAZON AWS from AMAZON, INC., the GOOGLE Cloud Platform from GOOGLE INC., and platform virtualization software and services from VMWARE, INC.

Cloud compute resources in a cloud computing environment are commonly presented to users or customers in a variety of ways, as illustrated in the example of FIG. 1. One cloud computing approach is a Software-as-a-Service ("SaaS") model wherein the compute resource provider 120 installs and maintains software, such as applications, Customer Relationship Management ("CRM") software, or a virtual user desktop, on the compute resource provider's facilities 120 and users access the software over the network 110.

Another cloud computing model is Platform-as-a-Service ("PaaS") where customers deploy customer-created or acquired application software, such as databases or tools, to the compute resource provider's facilities 120 and the provider hosts the customers application on the provider's compute resources, e.g. network, servers, storage, or operating system. Yet another cloud computing model is Infrastructure-as-a-Service ("IaaS") where the customer is provided with a high-level Application Programming Interface ("API") to the physical computing resources of the compute resource provider.

Note that a compute resource provider system 120 can host services for multiple customers on the same facilities. Also note that network 110 can provide access to the client device 104 and compute resource provider system 120 to cyberattackers. It is common, therefore, to maintain the security of each customer's systems, data and applications, such as by encrypting communications between client device 104 and compute resource provider system 120 using digital certificates. Digital certificates for securing communications in environment 100, in this example, are issued and managed by AME certificate authority 130, which can manage a chain of trust for digital certificates that is rooted to a known root certificate, such as a root certificate associated with one of the compute resource providers noted above, that is normally used for PKI certificate verification in non-isolated cloud computing environment 100.

However, as noted above, certain critical sectors implement an isolated AGC environment 150 to further secure highly sensitive data and resources. In the example of FIG. 1, an air gap 101 separates isolated AGC environment 150 from non-isolated environment 100.

Similar to non-isolated cloud computing environment 100, isolated AGC environment 150 can include user or entity-controlled AGC client devices 154 in combination with cloud compute resources provided by AGC computer resource provider system 170. The client devices 154, in this example, are in communication with the resources of compute resource provider 170 through network 160, which is isolated from outside networks, such as network 110, to inhibit access to AGC environment 150 by cyberattackers.

Communications between AGC client devices 154 and AGC compute resource provider system 170 can be encrypted using digital certificates distributed in AGC environment 150. The AGC digital certificates, in this example, are issued and managed by AGC certificate authority 180, which can manage a chain of trust for digital certificates that is rooted to an AGC root certificate specific to AGC environment 150. The AGC digital certificates rooted on the AGC root certificate can be used for PKI certificate verification in the isolated AGC environment 150.

However, in conventional systems, the isolated AGC environment 150 does not have access to the chain of trust in the non-isolated environment 100. Conventionally, when an internal AGC operator provisions a new AGC root created by AGC certificate authority 180, the PKI system of the AGC environment 150 must blindly trust the new AGC root certificate. The PKI system is unable to distinguish between a valid AGC root certificate and a compromised AGC root certificate, such as an AGC root certificate issued by a malicious operator internal to the AGC environment 150. The disclosed technology is directed toward solving this problem by establishing trust in the new unknown AGC root certificate.

Figure 2A:
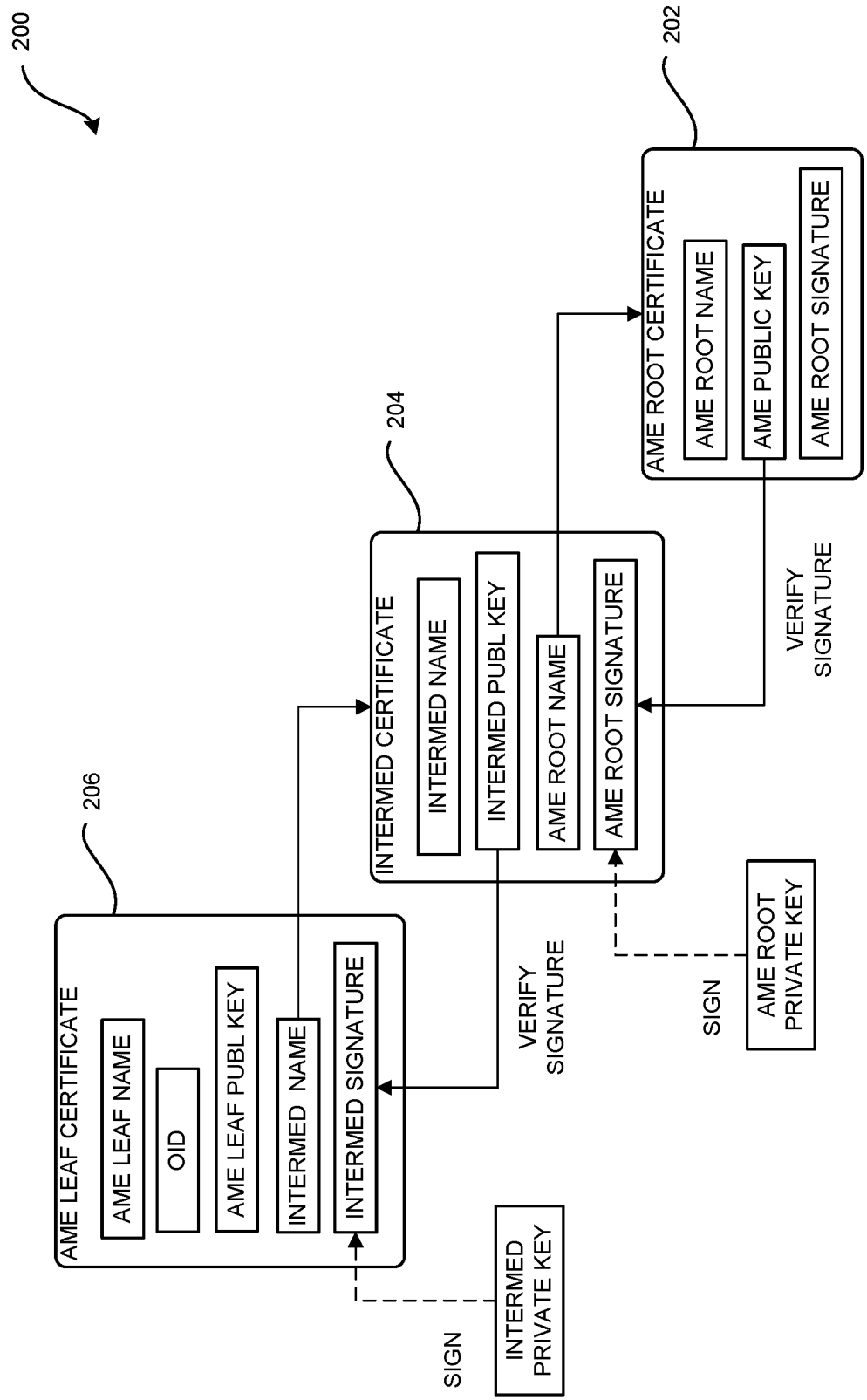
FIG. 2A is a schematic diagram showing an illustration of a chain of trust for a non-isolated environment hosted on a cloud computing resource provider system.

FIG. 2A is a schematic diagram showing an illustration of a PKI chain of trust 200 in a non-isolated environment, such as environment 100 in FIG. 1, hosted on a cloud computing resource provider system configured in accordance with the disclosed technology. Similar to a conventional PKI chain of trust, chain of trust 200 is rooted in AME root certificate 202, which is a trusted root certificate often associated with a known entity, such as MICROSOFT CORPORATION, AMAZON, INC. or GOOGLE INC.

Often, one or more intermediate certificates 204, such as a certificate associated with a certificate authority. In chain of trust 200, each certificate is cryptographically signed by the private key of a preceding certificate in the chain to which it is linked by reference. In this example, intermediate certificate 204 is signed by AME root certificate 202 and AME leaf certificate 206 is signed by intermediate certificate 204. The signature of each certificate can be verified using the public key of the preceding certificate to ensure the integrity of chain of trust 200.

Note that AME leaf certificate 206, in this example of the disclosed technology, includes a predetermined OID value corresponding to an AGC network. The OID value corresponds to an OID value configured into a bootstrap executable corresponding to an isolated AGC network. Also note that, conventionally, a chain of trust rooted on an AME root certificate would be used for PKI certificate verification in the non-isolated environment. By contrast, in the disclosed technology, the AME chain of trust 200 can be used for code signing and signing storage media.

Figure 2B:
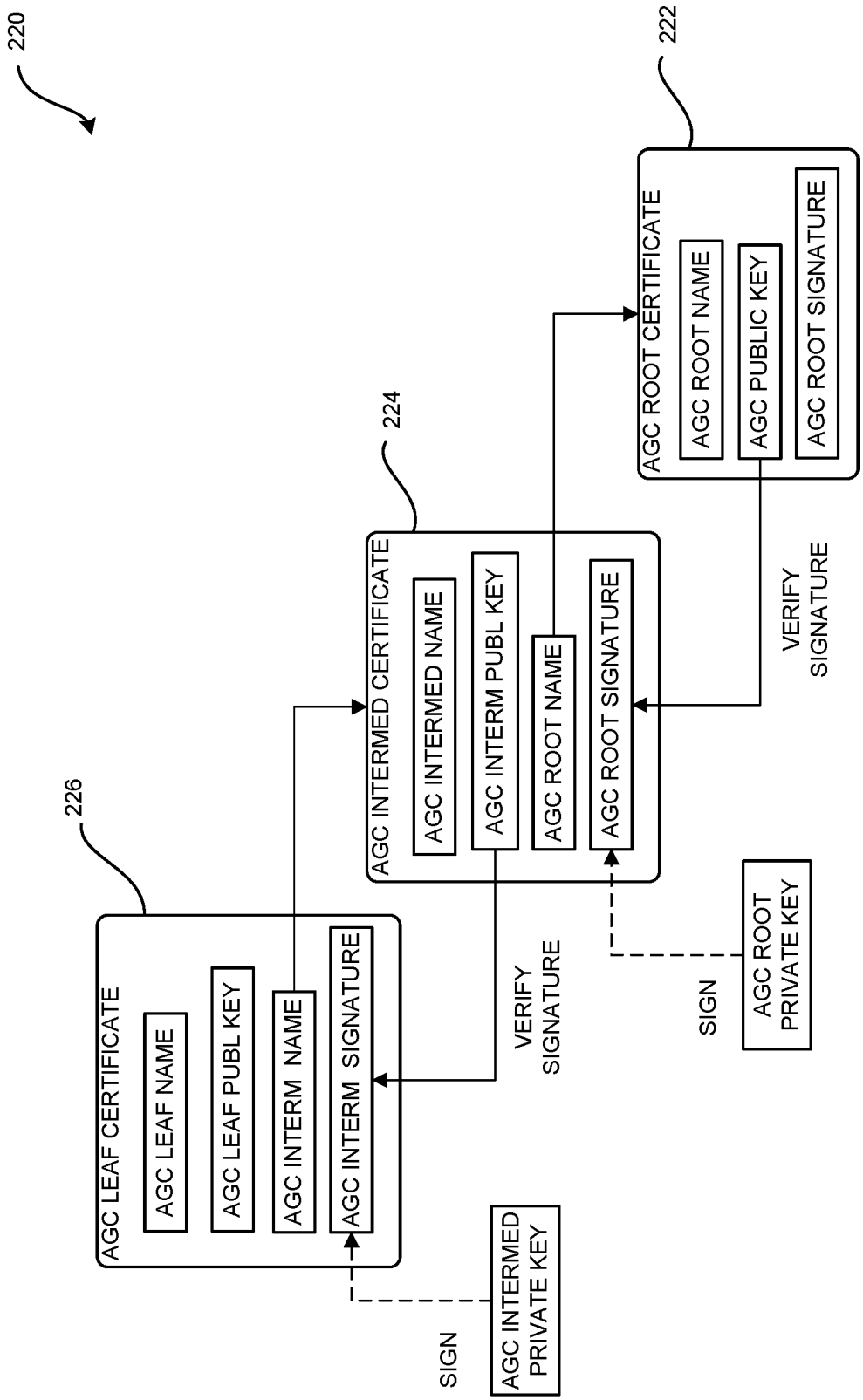
FIG. 2B is a schematic diagram showing an illustration of a chain of trust for an isolated air gapped environment hosted on a cloud computing resource provider system.

FIG. 2B is a schematic diagram showing an illustration of a chain of trust 220 for an isolated air gapped environment hosted on a cloud computing resource provider system. Chain of trust 220 is rooted to AGC root certificate 222, which is generated in the AGC environment. Similar to non-isolated chain of trust 200, each certificate is signed by a preceding certificate to ensure the internal integrity of chain of trust 220.

However, chain of trust 220 is vulnerable to a single point of failure in AGC root certificate 222. If AGC root certificate 222 is compromised, then PKI chain of trust 220 is also compromised. The disclosed technology is directed toward improving the level of security for an AGC environment by extending a chain of trust rooted in an AME root from a non-isolated environment to the isolated AGC environment.

Figure 3:
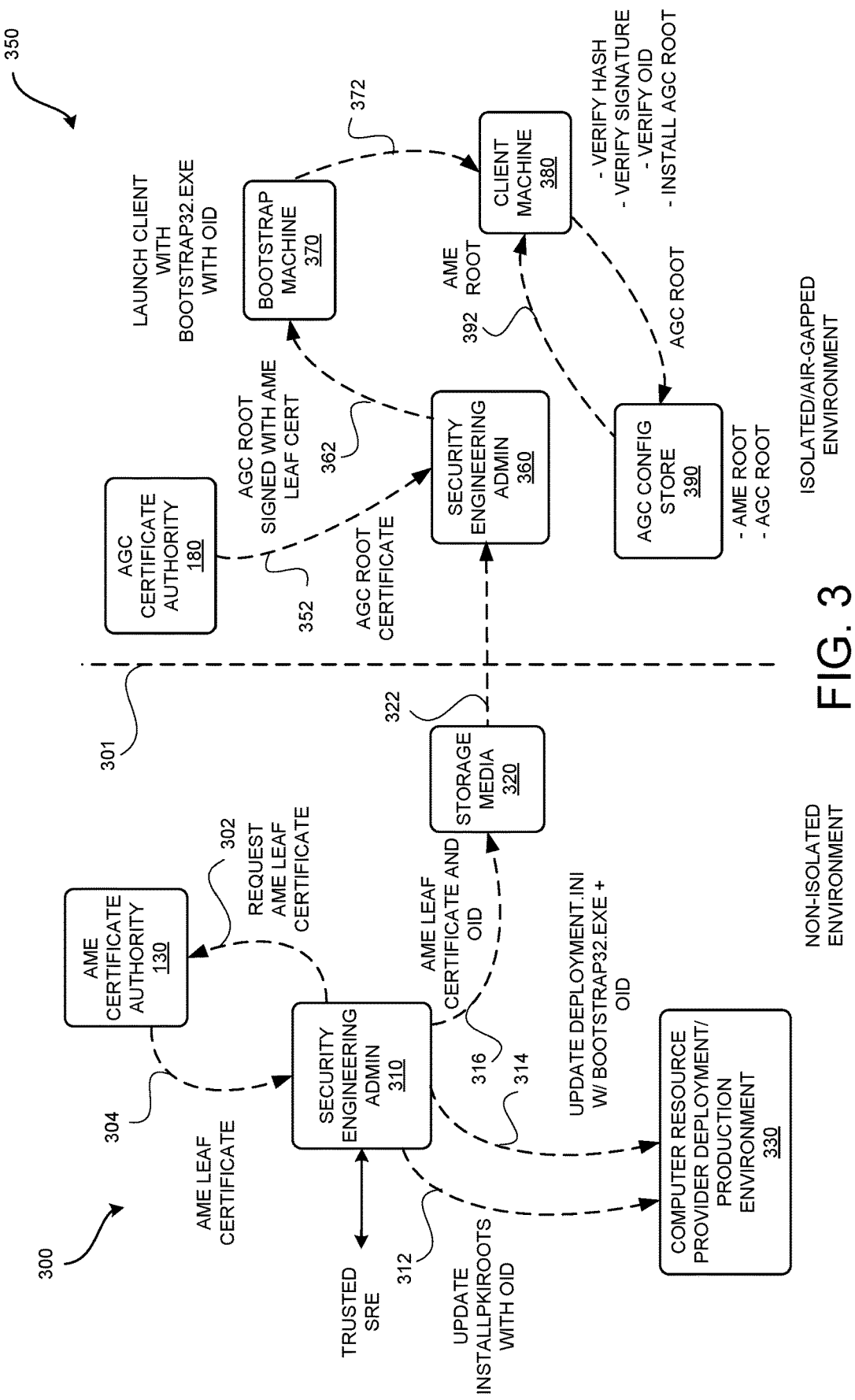
FIG. 3 is a software architecture diagram showing an illustration of establishing a chain of trust in an isolated air gapped environment hosted on a cloud compute resource provider system that is rooted to a public trust root according to one aspect of the disclosed technology.

FIG. 3 is a software architecture diagram showing an illustration of establishing a chain of trust in an isolated air gapped environment 350 hosted on a cloud compute resource provider system that is rooted to a public trust root in a non-isolated environment 300 according to one aspect of the disclosed technology. With regard to non-isolated environment 300, FIG. 3 illustrates an example of the operations on the public non-isolated environment 300 to create and configure an AME leaf certificate and bootstrap executable on the non-isolated side in support of isolated AGC environment 350.

In non-isolated environment 300, a trusted system resource engineer uses security engineering administrative interface 310 to, at 302, request an AME leaf certificate from AME certificate authority 130, which is returned at 304. At 312, InstallPKIroots is updated with an OID value for AGC environment 350 and, at 314, deployment.ini is updated with a bootstrap executable bootstrap32.exe that is configured with the OID value for the AGC environment 500, e.g. in InstallPKIroots and deployment.ini configured in a deployment environment 330 for a computer resource provider platform hosting the non-isolated environment 300. At 316, in this example, the AME leaf certificate and the OID value are stored to storage media 320.

At 322, storage media 320 is utilized to transport the AME leaf certificate and OID across air gap 301 to security engineering interface 360 for AGC environment 350. Security engineering interface 360 can access the bootstrap executable configured with the OID value in the computer resource provider deployment/production environment 330. At 352, an AGC root certificate is obtained from AGC certificate authority 180. The AGC root certificate is signed with the AME leaf certificate and, at 362, provided to bootstrap machine 370.

Bootstrap machine 370, at 372, launches client machine 380 with the bootstrap executable bootstrap32.exe from deployment.ini that is configured with the OID value. Bootstrap machine 380 verifies a hash value for the AGC root certificate.

Bootstrap machine 380 also verifies the AME leaf signature of the AGC root certificate using the AME root certificate. Because the isolated side is provisioned on a service platform associated with the AME root, the AME root can be obtained, at 392, from the AGC configuration store 390. Client machine 380 also checks whether the OID value in the AME leaf certificate matches the OID value configured in bootstrap32.exe.

If the signature on the AGC root certificate and the OID value is verified, then the AGC root certificate has been verified based on the AME chain of trust embodied in the AME leaf certificate, which roots to the AME root certificate. Client machine 380 can then installs the PKI system in isolated AGC environment 350 with the AGC root certificate.

Figure 4A:
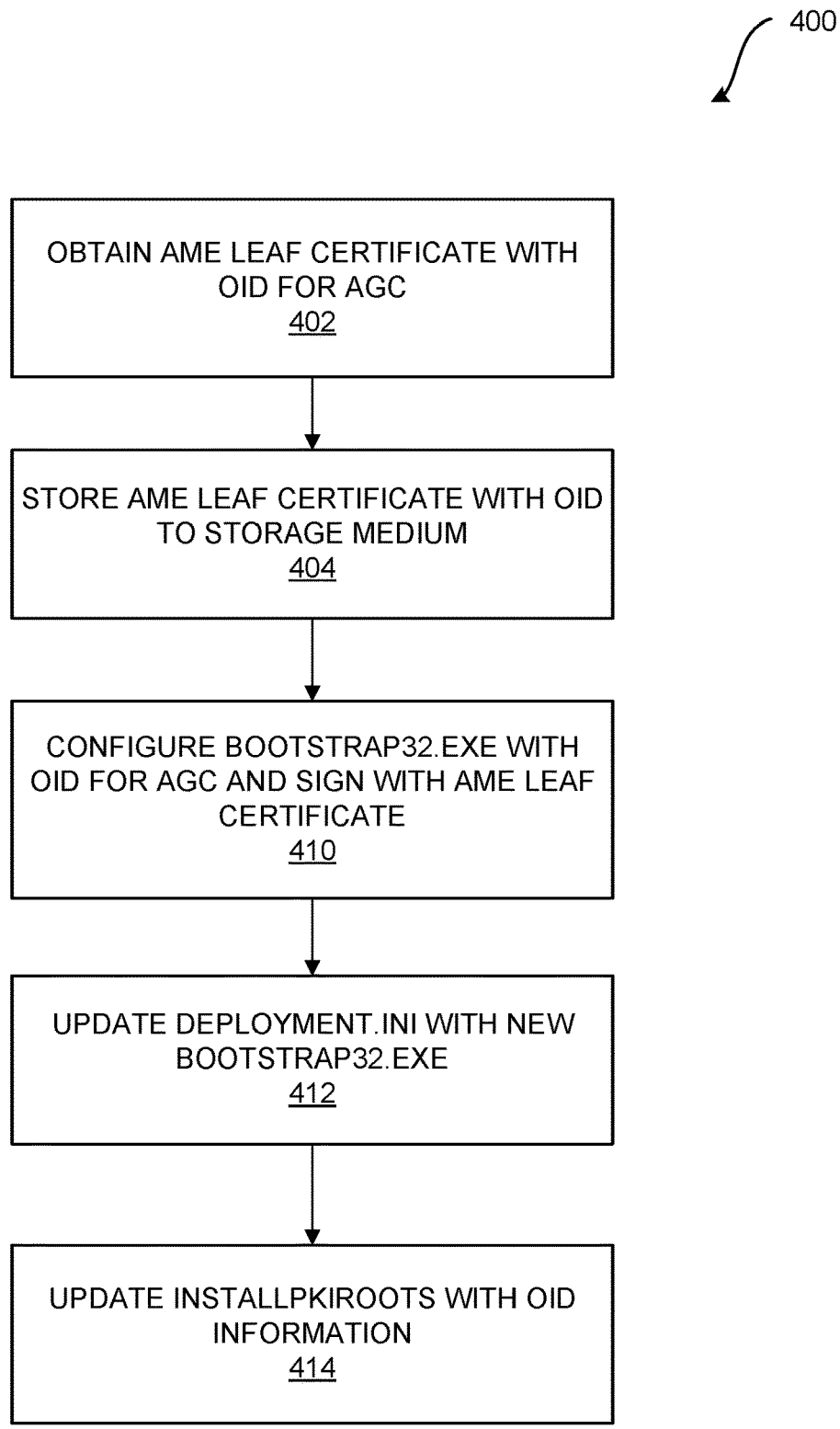
FIG. 4A is a control flow diagram showing a routine that illustrates aspects of operations in a non-isolated environment for establishing a chain of trust in an isolated air gapped environment hosted on a cloud compute resource provider system.

FIG. 4A is a control flow diagram that illustrates aspects of a process 400 in a non-isolated environment, such as non-isolated environment 300 in FIG. 3, for establishing a chain of trust in an isolated air gapped environment hosted on a cloud compute resource provider system. At 402, on a non-isolated side, an AME leaf certificate rooted to AME root is obtained along with an OID value corresponding to an AGC environment. At 404, the AME leaf certificate and OID value are stored in a secure storage medium, such as an individual's smart identity storage device, for transfer to a non-isolated side.

At 410, a bootstrap executable bootstrap32.exe is configured with the OID value for the AGC environment and the bootstrap executable is signed with the AME leaf certificate, e.g. the MICROSOFT root certificate.

Note that a new machine in an environment typically only accepts trusted executables signed by an AME root certificate for an AME platform for the environment. For example, a new MICROSOFT WINDOWS machine with no certificates yet installed, e.g. no AME or AGC certificates, will only trust executables that are signed by the MICROSOFT root certificate. Anything that is signed by Microsoft root cert is allowed to run on Windows OS. AME or AGC certs are not part of the Windows OS image. Because Bootstrap32.exe is the only executable that is initially allowed to run on a virgin Windows OS image, it acts as the start point of establishing more trust (AME and AGC).

At 412, deployment.ini for the AME deployment environment 330 is updated with the bootstrap32.exe configured with the OID value and, at 414, InstallPKIroots is updated with the OID value information in a deployment pipeline, e.g. in the deployment environment 330 for a computer resource provider platform hosting the non-isolated environment 300 and the isolated environment 350.

Note that the update of InstallPKIRoots with OIDs can be performed via source code check in. InstallPKIRoots is a library that can be compiled into Bootstrap32.exe. As a result, Bootstrap32.exe carries the AME root certificate by virtue of statically linking to the static InstallPKIRoots library. In other words, Bootstrap32.exe embeds the InstallPKIRoots static library and the InstallPKIRoots static library embeds the AME public leaf certificate and OID. Bootstrap32.exe is effectively updated with the AME public leaf certificate and the OID for an AGC environment by virtue of embedding the AME public leaf certificate and the OID in the InstallPKIRoots library.

Figure 4B:
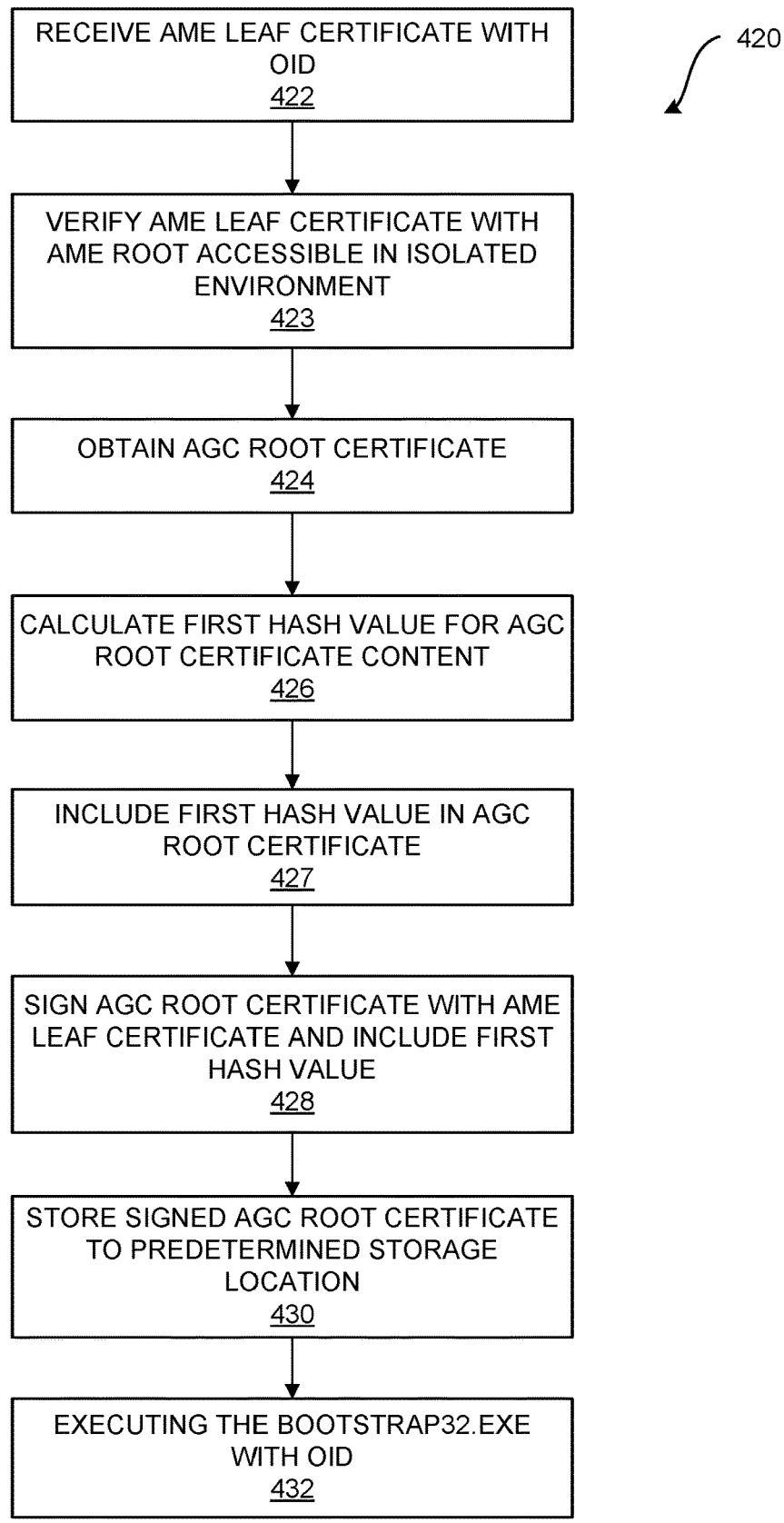
FIG. 4B is a control flow diagram showing a routine that illustrates aspects of operations in an isolated air gapped environment hosted on a cloud compute resource provider system for establishing a chain of trust in the isolated air gapped environment.

FIG. 4B is a control flow diagram showing a process 420 that illustrates aspects of operations in an isolated air gapped environment, such as AGC environment 350 in FIG. 3, hosted on a cloud compute resource provider system for establishing a chain of trust in the isolated air gapped environment.

At 422, the AME leaf certificate and OID value for the AGC environment are received. For example, a trusted system resources engineer (SRE) can upload the AME leaf certificate and OID value from storage media 320. However, other approaches to transferring the AME leaf certificate and OID value may be suitable in some implementations. In some environments, the AME leaf certificate can be required to be signed by multiple trusted SREs to reduce the possibility that the PKI installation in the AGC environment could be compromised by a single SRE.

At 423, the AME leaf certificate can be verified using the AME root certificate accessible in the AGC environment. If the AME root certificate in the AME leaf certificate is identical to the AME root certificate accessible in the AGC environment, then the AME leaf certificate can be validated.

At 424, an AGC root certificate is obtained, such as from certificate authority 180. At 426, in some implementations, a first hash value is calculated for the AGC root certificate content. At 428, the AGC root certificate and the first hash value is signed with the private key of the AME leaf certificate to create a signed blob for the AGC root certificate. At 430, the signed blob is stored in a predetermined configuration storage location.

At 432, the version of the bootstrap executable bootstrap32.exe with the OID value can be executed, such as by an SRE using security engineering administrative interface 360, to instantiate a client machine for the AGC environment.

Figure 4C:
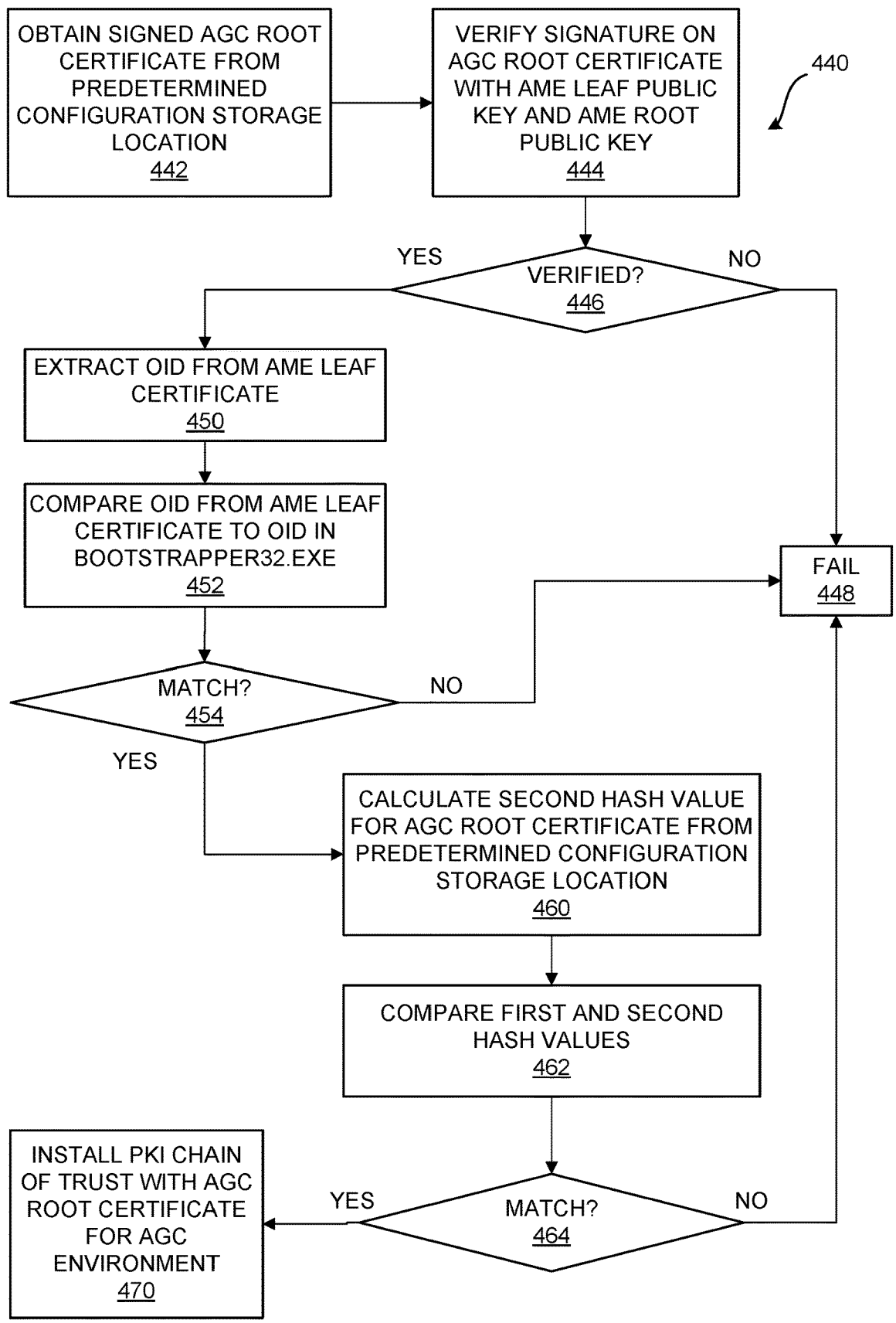
FIG. 4C is a control flow diagram showing a routine that illustrates aspects of further operations for instantiating a client machine in an isolated air gapped environment hosted on a cloud compute resource provider system and establishing a chain of trust for the isolated air gapped environment.

FIG. 4C is a control flow diagram showing a process 440 that illustrates aspects of further operations for instantiating a client machine in an isolated air gapped environment, such as client machine 380 in isolated AGC environment 350, hosted on a cloud compute resource provider system and establishing a chain of trust for the isolated air gapped environment. In this example, the isolated AGC environment 350 is hosted by the same computer resource provider platform that hosts the non-isolated environment 300 and the InstallPKIroots and deployment.ini data and bootstratp32.exe updated with the OID value for the AGC environment 350 are accessible in deployment environment 330 for the computer resource provider platform.

At 442, the signed AGC root certificate blob is obtained from the predetermined configuration storage location. At 444, the signature on the signed AGC root certificate is verified using the public key of the AME leaf certificate and the AME root public key that is configured in the AGC environment 350 in connection with the cloud service platform provider. If the signature verification fails, then control branches at 446 to 448 and no further PKI installation can occur.

If the signature verification is successful, then control branches at 446 to 450 to extract the OID value form the AME leaf certificate. At 452, the OID value from the AME leaf certificate is compared to the OID value from the bootstrapper executable bootstrap32.exe. If the OID values fail to match, then control branches at 454 to 448.

If the OID values do match, control branches at 454 to 460 where a second hash value is calculated for the contents of the AGC root certificate obtained from the stored AGC root certificate blob. The first and second hash values are compared, at 462, to verify the contents of the AGC root certificate. If the hash values do not match, then control branches at 464 to 448.

If the first and second hash values match, then the content of the AGC root certificate is verified and control branches at 464 to 470 to distribute the AGC root certificate in the isolated AGC environment, e.g. perform PKI root installation in the AGC environment with the AGC root certificate.

Figure 5:
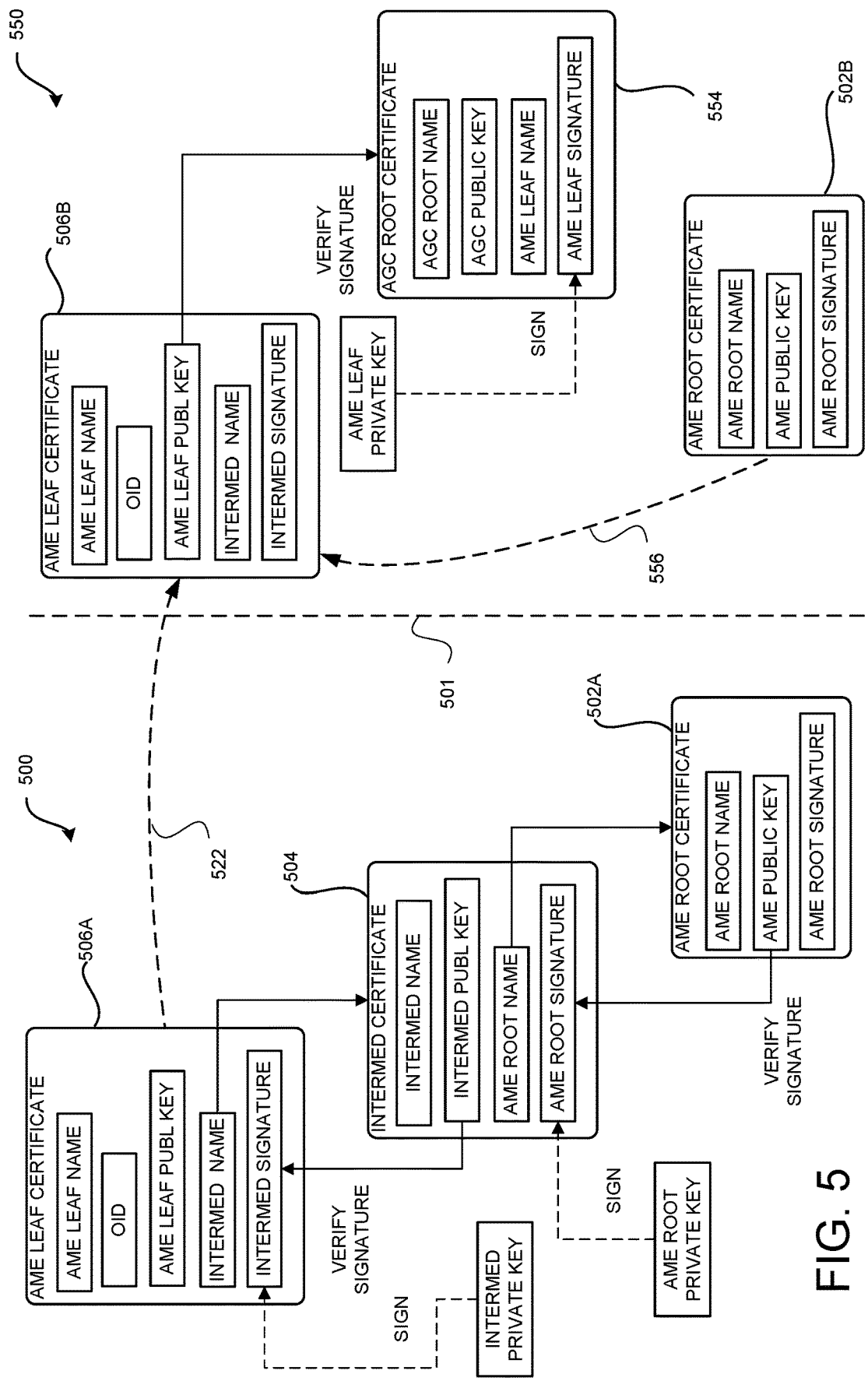
FIG. 5 is a schematic diagram showing an illustration of a chain of trust for an isolated air gapped environment hosted on a cloud computing resource provider system rooted in a public root.

At this point, the chain of trust based on the AGC root certificate is established in the AGC environment and the AGC root has been verified using the AME chain of trust from the non-isolated AME environment. FIG. 5 is a schematic diagram showing an illustration of a chain of trust 550 for an isolated AGC environment hosted on a cloud computing resource provider system rooted in an AGC root certificate that has been verified based on AME chain of trust 500.

As noted above, the disclosed technology utilizes a non-isolated AME chain of trust 500 that is rooted in AME root certificate 502A. AME leaf certificate 506A is obtained for use in verifying an AGC root certificate utilizing the AME chain of trust 500, as discussed above with respect to operations 402 and 404 of FIG. 4A. An OID value corresponding to an AGC environment is added to AME leaf certificate 506A.

In the example AME chain of trust 500, AME leaf certificate 506A is signed by and linked to intermediate certificate 504. Intermediate certificate 504, in turn, is signed by and linked to AME root certificate 502A, which typically corresponds to a cloud resources platform provider. Note that multiple intermediate certificates may be disposed between AME root certificate 502A and AME leaf certificate 506A.

At 522, AME leaf certificate 506A was transferred across airgap 501 as AME leaf certificate 506B for use in establishing AGC chain of trust 550. The private key of AME leaf certificate 506B is used to sign AGC root certificate 554 and the private key is destroyed to prevent its reuse. Subsequently, the public key of AME leaf certificate 506B can be used to verify the signature of AGC root certificate 554. In some implementations, the AGC root certificate 554 can be hashed to create a hash value of its contents and the hash value signed with the private key of AME leaf certificate 506B.

As noted above, the AME root certificate is available in the isolated environment as AME root certificate 502B. The integrity of the AME leaf certificate 506B can be verified by comparing the AME root certificate embedded in the AME leaf certificate to AME root certificate 502B accessible in the isolated environment.

As described above, a client machine instantiated in the isolated environment using the bootstrap executable for the isolated environment can verify the signature of the AGC root certificate 554 using the public key of the AME leaf certificate. The client machine can also compare the OID value of the AME leaf certificate 506B against the OID value embedded in the bootstrap executable. If these checks are successfully, then, in some implementations, the hash value of the AGC root certificate 554 is checked. If the checks pass, then the AGC root can be installed as the PKI root for the isolated environment.

It is to be appreciated that while the embodiments disclosed herein have been presented in the context of a service platform having a deployment or production environment for instantiation of an isolated environment and installation of a PKI chain of trust, the technologies disclosed herein can be similarly applied to other contexts where similar functionality is utilized to establish an isolated environment and cryptographic systems for secure communication.

Figure 6:
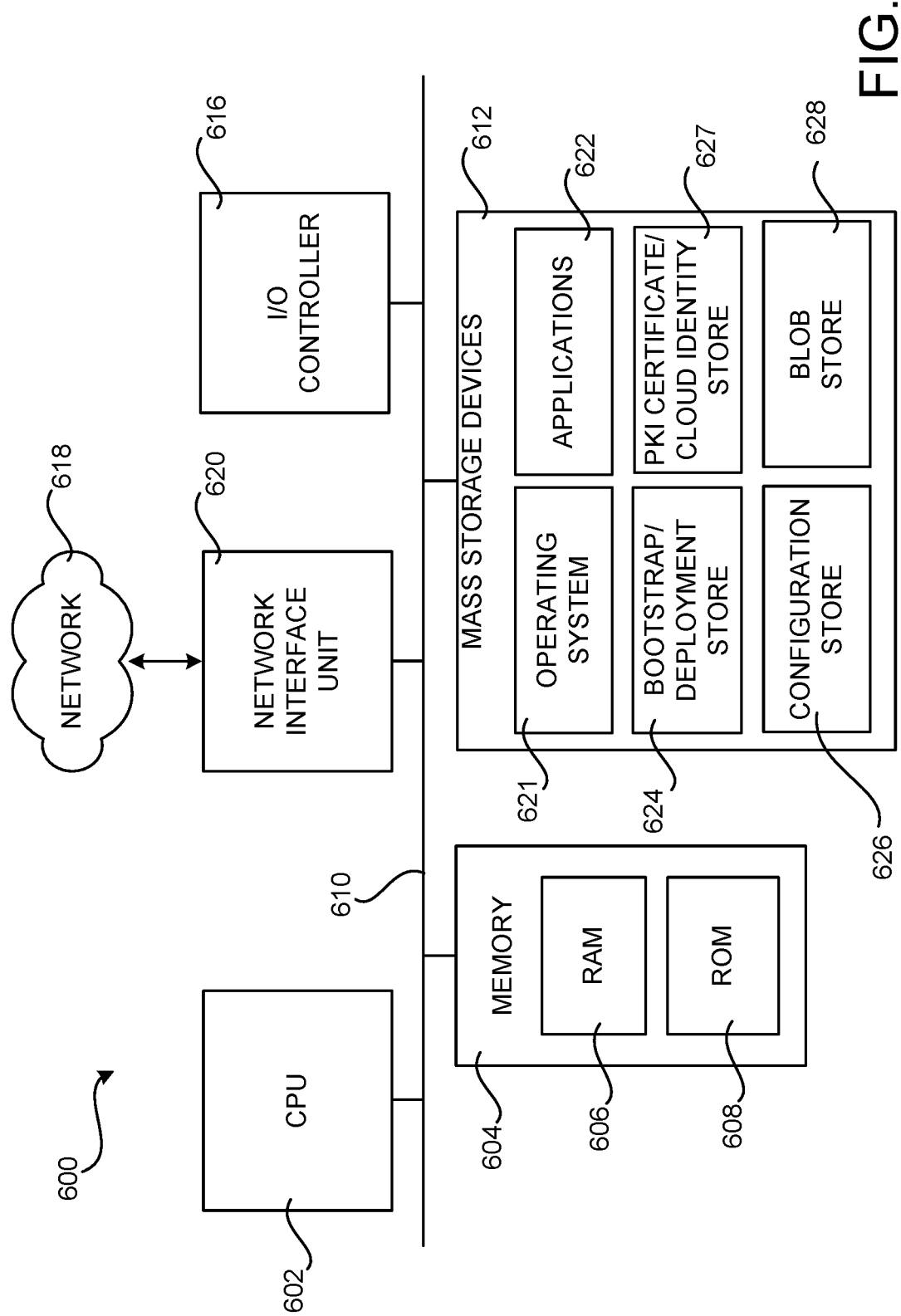
FIG. 6 is a computer architecture diagram showing an illustrative computer hardware and software architecture for a computing device, such as the computing devices shown in FIGS. 1 and 3, that can implement aspects of the technologies presented herein.

FIG. 6 is a computer architecture diagram that shows an architecture for a computer 600 capable of executing the software components described herein. The architecture illustrated in FIG. 6 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 600 shown in FIG. 6 can be utilized to implement a computing device capable of executing any of the software components presented herein. For example, and without limitation, the computing architecture described with reference to FIG. 6 can be utilized to implement the computing devices 104 or resource servers 120 illustrated in FIG. 1 or some or all of the components of the systems in FIG. 3 and described above, which are capable of executing the various software components described above.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, is stored in the ROM 608. The computer 600 further includes one or more mass storage devices 612 for storing an operating system 621, application programs 622, and other types of programs including, but not limited to, the bootstrap/deployment store 624 and configuration store 626. The mass storage devices 612 can also be configured to store the PKI certificate and cloud identity store 627 and blob store 628.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 618. The computer 600 can connect to the network 618 through a network interface unit 620 connected to the bus 610. It should be appreciated that the network interface unit 620 can also be utilized to connect to other types of networks and remote computer systems. The computer 600 can also include an input/output controller 616 for receiving and processing input from a number of other devices, including a keyboard, mouse, touch input, or electronic stylus (not shown in FIG. 6). Similarly, the input/output controller 616 can provide output to a display screen or other type of output device (also not shown in FIG. 6).

It should be appreciated that the software components described herein, such as the bootstrap machine 370 and client machine 380, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
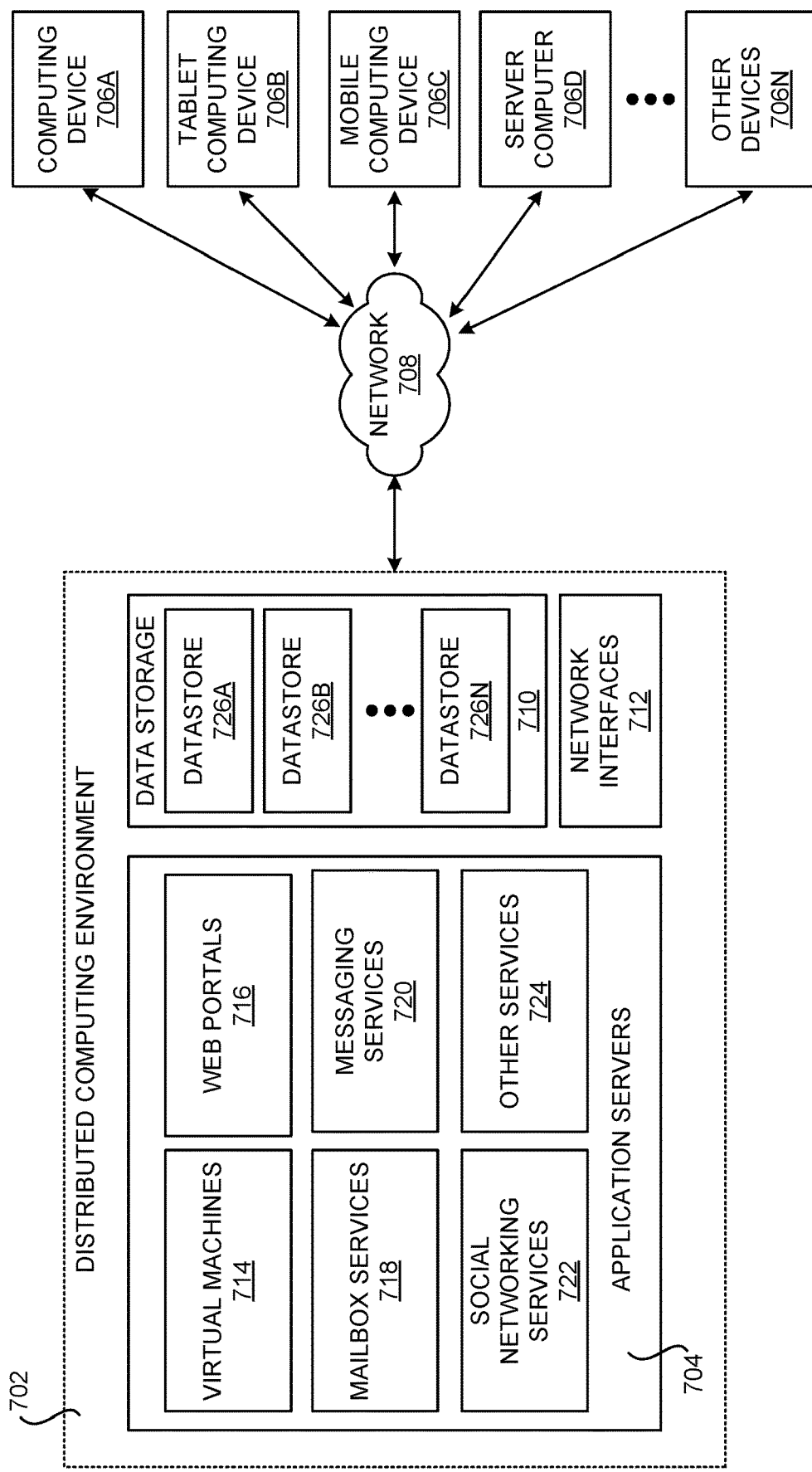
FIG. 7 is a network diagram illustrating a distributed computing environment capable of implementing aspects of the technologies presented herein.

FIG. 7 shows aspects of an illustrative distributed computing environment 702 that can provide cloud sourced resources, such as the resources provided by one or more compute resource provider systems, in which the software components described herein can be executed. Thus, the distributed computing environment 702 illustrated in FIG. 7 can be used to execute program code capable of providing the functionality described above with respect to FIGS. 1-5 and/or any of the other software components described herein.

According to various implementations, the distributed computing environment 702 operates on, in communication with, or as part of a network 708. One or more client devices 706A-706N (hereinafter referred to collectively and/or generically as "devices 706") can communicate with the distributed computing environment 702 via the network 708 and/or other connections (not illustrated in FIG. 7).

In the illustrated configuration, the devices 706 include: a computing device 706A such as a laptop computer, a desktop computer, or other computing device; a "slate" or tablet computing device ("tablet computing device") 706B; a mobile computing device 706C such as a mobile telephone, a smartphone, or other mobile computing device; a server computer 706D; and/or other devices 706N. It should be understood that any number of devices 706 can communicate with the distributed computing environment 702. Two example computing architectures for the devices 706 are illustrated and described herein with reference to FIGS. 6 and 8. It should be understood that the illustrated client devices 706 and computing architectures illustrated and described herein are illustrative and should not be construed as being limited in any way.

In the illustrated configuration, the distributed computing environment 702 includes application servers 704, data storage 710, and one or more network interfaces 712. According to various implementations, the functionality of the application servers 704 can be provided by one or more server computers that are executing as part of, or in communication with, the network 708. The application servers 704 can host various services such as virtual machines, portals, and/or other resources. In the illustrated configuration, the application servers 704 host one or more virtual machines 714 for hosting applications, such as program components for implementing the functionality described above with regard to FIGS. 1-5. It should be understood that this configuration is illustrative, and should not be construed as being limiting in any way. The application servers 704 might also host or provide access to one or more web portals, link pages, websites, and/or other information ("web portals") 716.

According to various implementations, the application servers 704 also include one or more mailbox services 718 and one or more messaging services 720. The mailbox services 718 can include electronic mail ("email") services. The mailbox services 718 can also include various personal information management ("PIM") services including, but not limited to, calendar services, contact management services, collaboration services, and/or other services. The messaging services 720 can include, but are not limited to, instant messaging ("IM") services, chat services, forum services, and/or other communication services.

The application servers 704 can also include one or more social networking services 722. The social networking services 722 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 722 are provided by or include the FACEBOOK social networking service, the LINKEDIN professional networking service, the FOURSQUARE geographic networking service, and the like. In other configurations, the social networking services 722 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 722 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 722 are not mentioned herein for the sake of brevity. As such, the configurations described above are illustrative, and should not be construed as being limited in any way.

As also shown in FIG. 7, the application servers 704 can also host other services, applications, portals, and/or other resources ("other services") 724. These services can include, but are not limited to, streaming video services like the NETFLIX streaming video service and productivity services such as the GMAIL email service from GOOGLE INC. It thus can be appreciated that activities performed by users of the distributed computing environment 702 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 702 can include data storage 710. According to various implementations, the functionality of the data storage 710 is provided by one or more databases operating on, or in communication with, the network 708. The functionality of the data storage 710 can also be provided by one or more server computers configured to host data for the distributed computing environment 702. The data storage 710 can include, host, or provide one or more real or virtual datastores 726A-726N (hereinafter referred to collectively and/or generically as "datastores 726"). The datastores 726 are configured to host data used or created by the application servers 704 and/or other data.

The distributed computing environment 702 can communicate with, or be accessed by, the network interfaces 712. The network interfaces 712 can include various types of network hardware and software for supporting communications between two or more computing devices including, but not limited to, the devices 706 and the application servers 704. It should be appreciated that the network interfaces 712 can also be utilized to connect to other types of networks and/or computer systems.

It should be understood that the distributed computing environment 702 described herein can implement any aspects of the software elements described herein with any number of virtual computing resources and/or other distributed computing functionality that can be configured to execute any aspects of the software components disclosed herein. It should also be understood that the devices 706 can also include real or virtual machines including, but not limited to, server computers, web servers, personal computers, gaming consoles or other types of gaming devices, mobile computing devices, smartphones, and/or other devices. As such, various implementations of the technologies disclosed herein enable any device configured to access the distributed computing environment 702 to utilize the functionality described herein.

Figure 8:
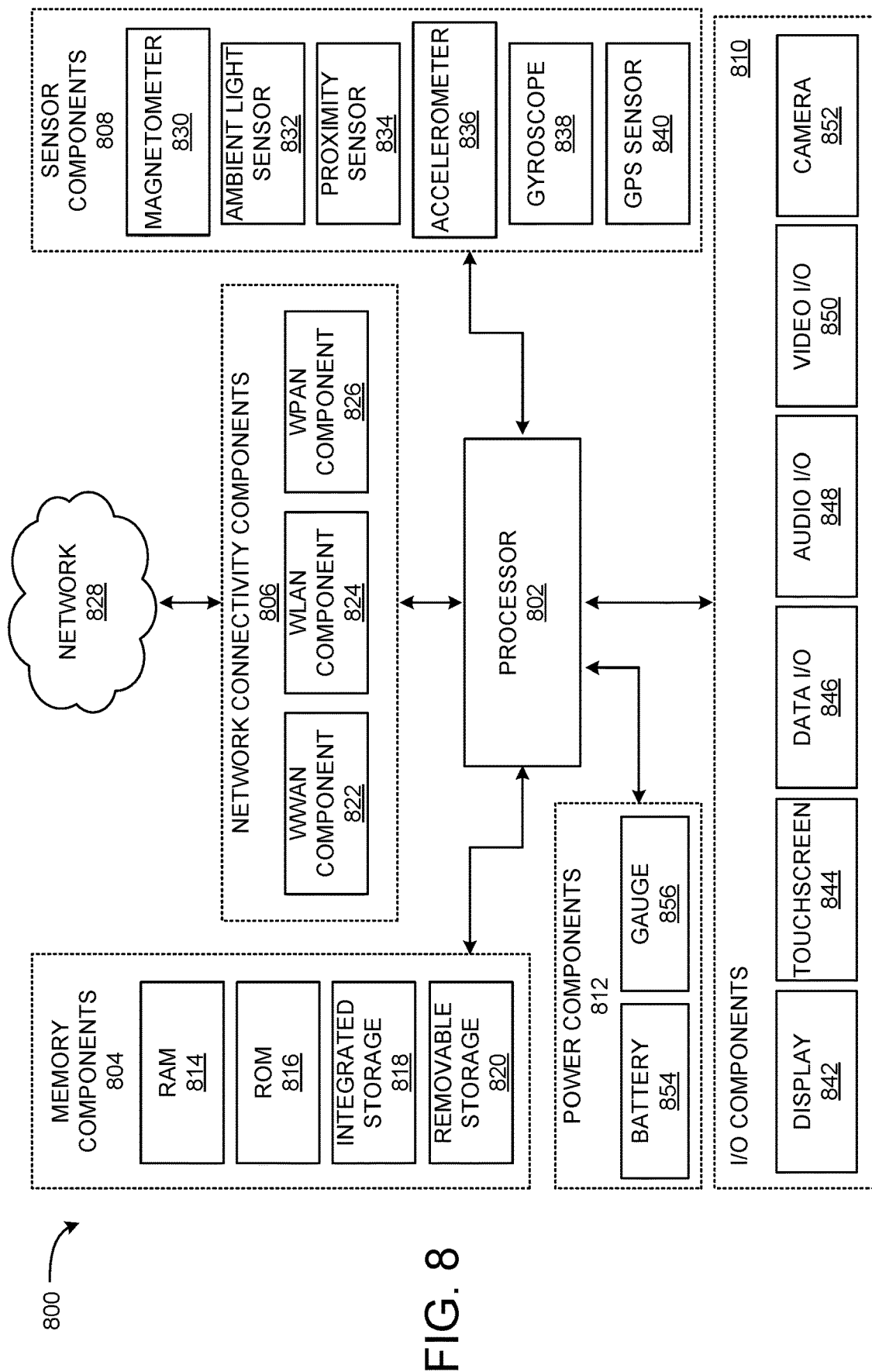
FIG. 8 is a computer architecture diagram illustrating a computing device architecture for a computing device, such as the computing devices shown in FIGS. 1 and 3, that is capable of implementing aspects of the technologies presented herein.

Turning now to FIG. 8, an illustrative computing device architecture 800 will be described for a computing device, such as the computing devices 104 or compute resource provider 120 illustrated in FIG. 1 or some or all of the components of the systems illustrated in FIG. 3, that is capable of executing the various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 800 is also applicable to any of the devices 706 shown in FIG. 7. Furthermore, aspects of the computing device architecture 800 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, smartphone, or tablet computer devices that utilize a touchscreen or some other touch-enabled device, such as a touch-enabled track pad or touch-enabled mouse. The computing device architecture 800 can also be utilized to implement the computing devices 104 or compute resource provider 120 illustrated in FIG. 1 or some or all of the components of the systems illustrated in FIG. 3 and/or other types of computing devices for implementing or consuming the functionality described herein.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can be connected electrically in order to interact and carry out device functions. In some configurations, the components are arranged so as to communicate via one or more busses (not shown).

The processor 802 includes one or more CPU cores configured to process data, execute computer executable instructions of one or more application programs and to communicate with other components of the computing device architecture 800 in order to perform various functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, California and others. In some configurations, the processor 802 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein might also be connected. As such, the integrated storage 818 is integrated in the computing device. The integrated storage 818 can be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, the WINDOWS operating system from MICROSOFT CORPORATION, the IOS operating system from APPLE INC. of Cupertino, California, and ANDROID operating system from GOOGLE INC. of Mountain View, California Other operating systems can also be utilized.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which can be a WWAN, a WLAN, or a WPAN. Although a single network 828 is illustrated, the network connectivity components 806 can facilitate simultaneous communication with multiple networks. For example, the network connectivity components 806 can facilitate simultaneous communications with multiple networks via one or more of a WWAN, a WLAN, or a WPAN.

The network 828 can be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 828 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 can be configured to provide voice and/or data communications with any combination of the above technologies. The network 828 can be configured or adapted to provide voice and/or data communications in accordance with future generation technologies.

In some configurations, the WWAN component 822 is configured to provide dual-multi-mode connectivity to the network 828. For example, the WWAN component 822 can be configured to provide connectivity to the network 828, wherein the network 828 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 828 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 828 via the WI-FI access points. Such connections can be secured via various encryption technologies including, but not limited, WI-FI Protected Access ("WPA"), WPA2, Wired Equivalent Privacy ("WEP"), and the like.

The network 828 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, might also be incorporated in the computing device architecture 800.

The magnetometer 830 is configured to measure the strength and direction of a magnetic field. In some configurations, the magnetometer 830 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low light and bright light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance user input operations. Other uses of the gyroscope 838 are contemplated.

The GPS sensor 840 is configured to receive signals from GPS satellites for use in calculating a location. The location calculated by the GPS sensor 840 can be used by any application program that requires or benefits from location information. For example, the location calculated by the GPS sensor 840 can be used with a navigation application program to provide directions from the location to a destination or directions from the destination to the location. Moreover, the GPS sensor 840 can be used to provide location information to an external location-based service, such as E911 service. The GPS sensor 840 can obtain location information generated via WI-FI, WIMAX, and/or cellular triangulation techniques utilizing one or more of the network connectivity components 806 to aid the GPS sensor 840 in obtaining a location fix. The GPS sensor 840 can also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 can include discrete processors configured to support the various interfaces described below or might include processing functionality built-in to the processor 802.

The display 842 is an output device configured to present information in a visual form. In particular, the display 842 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device can have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 844. As such, a developer can create gestures that are specific to a particular application program.

In some configurations, the touchscreen 844 supports a tap gesture in which a user taps the touchscreen 844 once on an item presented on the display 842. The tap gesture can be used for various reasons including, but not limited to, opening or launching whatever the user taps, such as a graphical icon. In some configurations, the touchscreen 844 supports a double tap gesture in which a user taps the touchscreen 844 twice on an item presented on the display 842. The double tap gesture can be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture can be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture can be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture can be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 848 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLU-RAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 can utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 854, which can be connected to a battery gauge 856. The batteries 854 can be rechargeable or disposable. Rechargeable battery types include, but are not limited to, lithium polymer, lithium ion, nickel cadmium, and nickel metal hydride. Each of the batteries 854 can be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector (not shown), which can be combined with one or more of the aforementioned I/O components 810. The power components 812 can interface with an external power system or charging equipment via a power I/O component 810. Other configurations can also be utilized.

Based on the foregoing, it should be appreciated that a compute resource provider system has been disclosed that is effective in establishing a PKI chain of trust in an isolated cloud computing environment that is verified with a PKI chain of trust external to the isolated environment. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for establishing a PKI (Public Key Infrastructure) chain of trust in an isolated cloud computing environment, comprising:
   receiving a digital leaf certificate in the isolated cloud computing environment, the digital leaf certificate being rooted to a first root certificate in a non-isolated PKI chain of trust in a non-isolated cloud computing environment and the digital leaf certificate including a first object identifier value,
   wherein the digital leaf certificate is received to support establishing the PKI chain of trust rooted in a second root certificate for the isolated cloud computing environment;
   obtaining a second root certificate in the isolated cloud computing environment;
   signing the second root certificate with a private key of the digital leaf certificate to generate a signed blob;
   storing the signed blob to a predetermined storage location in the isolated cloud computing environment;
   executing a bootstrap executable configured with a second object identifier value;
   obtaining the signed blob from the predetermined storage location in the isolated cloud computing environment;
   verifying the signed blob with the digital leaf certificate;
   when the signed blob is verified, comparing the first object identifier value from the digital leaf certificate to the second object identifier value from the bootstrap executable;
   when the first and second object identifier values match, installing a PKI chain of trust rooted in the second root certificate for the isolated cloud computing environment; and
   distributing the second root certificate in the isolated cloud computing environment to secure communications within the isolated cloud computing environment.

2. The computer-implemented method of claim 1, where: the method includes:
   calculating a first hash value for the second root certificate;
   including the first hash value in the second root certificate;
   calculating a second hash value for the second root certificate obtained from the signed blob obtained from the predetermined storage location in the isolated cloud computing environment;
   comparing the first hash value to the second hash value; and
   the step of, when the first and second object identifier values match, installing a PKI chain of trust rooted in the second root certificate for the isolated cloud computing environment comprises:
when the first and second object identifier values match and the first and second hash values match, installing a PKI chain of trust rooted in the second root certificate for the isolated cloud computing environment.

3. The method of claim 1, the method including:
obtaining the digital leaf certificate in the non-isolated cloud computing environment;
storing the digital leaf certificate with the first object identifier value in a storage medium;
configuring the bootstrap executable with the second object identifier value, the second object identifier value matching the first object identifier value;
updating a deployment environment with the bootstrap executable configured with the second object identifier value; and
updating InstallPKIroots in the development environment with the second object identifier value.

4. The method of claim 3, where the storage medium storing the digital leaf certificate with the first object identifier value comprises a removable storage medium.

5. The method of claim 3, where the first object identifier value is stored as an X.509 property of the digital leaf certificate.

6. The method of claim 1, wherein the first root certificate in the non-isolated PKI chain of trust is accessible in the isolated environment.

7. The method compute resource provider system of claim 6, wherein the method includes verifying the digital leaf certificate with the first root certificate that is accessible in the isolated environment.

8. One or more non-transitory computer storage media having computer executable instructions stored thereon which, when executed by one or more processors, cause the processors to execute a method for establishing a PKI chain of trust in an isolated cloud computing environment, comprising:
receiving a digital leaf certificate in the isolated cloud computing environment, the digital leaf certificate being rooted to a first root certificate in a non-isolated PKI chain of trust in a non-isolated cloud computing environment and the digital leaf certificate including a first object identifier value,
wherein the digital leaf certificate is received to support establishing the PKI chain of trust rooted in a second root certificate for the isolated cloud computing environment;
obtaining a second root certificate in the isolated cloud computing environment;
signing the second root certificate with a private key of the digital leaf certificate to generate a signed blob;
storing the signed blob to a predetermined storage location in the isolated cloud computing environment;
executing a bootstrap executable configured with a second object identifier value;
obtaining the signed blob from the predetermined storage location in the isolated cloud computing environment;
verifying the signed blob with the digital leaf certificate;
when the signed blob is verified, comparing the first object identifier value from the digital leaf certificate to the second object identifier value from the bootstrap executable;
when the first and second object identifier values match, installing a PKI chain of trust rooted in the second root certificate for the isolated cloud computing environment; and distributing the second root certificate in the isolated cloud computing environment to secure communications within the isolated cloud computing environment.

9. The computer storage media of claim 8, where the method includes:
calculating a first hash value for the second root certificate;
including the first hash value in the second root certificate;
calculating a second hash value for the second root certificate obtained from the signed blob obtained from the predetermined storage location in the isolated cloud computing environment;
comparing the first hash value to the second hash value; and
the step of, when the first and second object identifier values match, installing a PKI chain of trust rooted in the second root certificate for the isolated cloud computing environment comprises:
when the first and second object identifier values match and the first and second hash values match, installing a PKI chain of trust rooted in the second root certificate for the isolated cloud computing environment.

10. The computer storage media of claim 8, where the method includes:
obtaining the digital leaf certificate in the non-isolated cloud computing environment;
storing the digital leaf certificate with the first object identifier value in a storage medium;
configuring the bootstrap executable with the second object identifier value, the second object identifier value matching the first object identifier value;
updating a deployment environment with the bootstrap executable configured with the second object identifier value; and
updating InstallPKIroots in the development environment with the second object identifier value.

11. The computer storage media of claim 10, where the storage medium storing the digital leaf certificate with the first object identifier value comprises a removable storage medium.

12. The computer storage media of claim 8, where the first object identifier value is stored as an X.509 property of the digital leaf certificate.

13. The computer storage media of claim 8, wherein the first root certificate in the non-isolated PKI chain of trust is accessible in the isolated environment.

14. The computer storage media of claim 13, wherein the method includes verifying the digital leaf certificate with the first root certificate that is accessible in the isolated environment.

15. A computer system that establishes a PKI chain of trust in an isolated cloud computing environment, the system comprising:
one or more processors; and
at least one computer storage medium having computer executable instructions stored thereon which, when executed by the one or more processors, cause the one or more processors to perform a method for establishing a PKI chain of trust in an isolated cloud computing environment, the method comprising:
receiving a digital leaf certificate in the isolated cloud computing environment, the digital leaf certificate being rooted to a first root certificate in a non-isolated PKI chain of trust in a non-isolated cloud computing environment and the digital leaf certificate including a first object identifier value, wherein the digital leaf certificate is received to support establishing the PKI chain of trust rooted in a second root certificate for the isolated cloud computing environment;

obtaining a second root certificate in the isolated cloud computing environment;

signing the second root certificate with a private key of the digital leaf certificate to generate a signed blob;

storing the signed blob to a predetermined storage location in the isolated cloud computing environment;

executing a bootstrap executable configured with a second object identifier value;

obtaining the signed blob from the predetermined storage location in the isolated cloud computing environment;

verifying the signed blob with the digital leaf certificate;

when the signed blob is verified, comparing the first object identifier value from the digital leaf certificate to the second object identifier value from the bootstrap executable;

when the first and second object identifier values match, installing a PKI chain of trust rooted in the second root certificate for the isolated cloud computing environment; and distributing the second root certificate in the isolated cloud computing environment to secure communications within the isolated cloud computing environment.

16. The computer system of claim 15, where the method includes:

calculating a first hash value for the second root certificate;

including the first hash value in the second root certificate;

calculating a second hash value for the second root certificate obtained from the signed blob obtained from the predetermined storage location in the isolated cloud computing environment;

comparing the first hash value to the second hash value; and the step of, when the first and second object identifier values match, installing a PKI chain of trust rooted in the second root certificate for the isolated cloud computing environment comprises:

when the first and second object identifier values match and the first and second hash values match, installing a PKI chain of trust rooted in the second root certificate for the isolated cloud computing environment.

17. The computer system of claim 15, where the method includes:

obtaining the digital leaf certificate in the non-isolated cloud computing environment;

storing the digital leaf certificate with the first object identifier value in a storage medium;

configuring the bootstrap executable with the second object identifier value, the second object identifier value matching the first object identifier value;

updating a deployment environment with the bootstrap executable configured with the second object identifier value; and updating InstallPKIroots in the development environment with the second object identifier value.

18. The computer system of claim 17, where the storage medium storing the digital leaf certificate with the first object identifier value comprises a removable storage medium.

19. The computer system of claim 15, where the first object identifier value is stored as an X.509 property of the digital leaf certificate.

20. The computer system of claim 15, where:

the first root certificate in the non-isolated PKI chain of trust is accessible in the isolated environment; and the method includes verifying the digital leaf certificate with the first root certificate that is accessible in the isolated environment.

* * * * *